Oct. 30, 1934.   L. F. LAMPLOUGH   1,978,586
METHOD OF AND APPARATUS FOR VULCANIZING MATERIAL ON ARTICLES
Filed Dec. 3, 1930
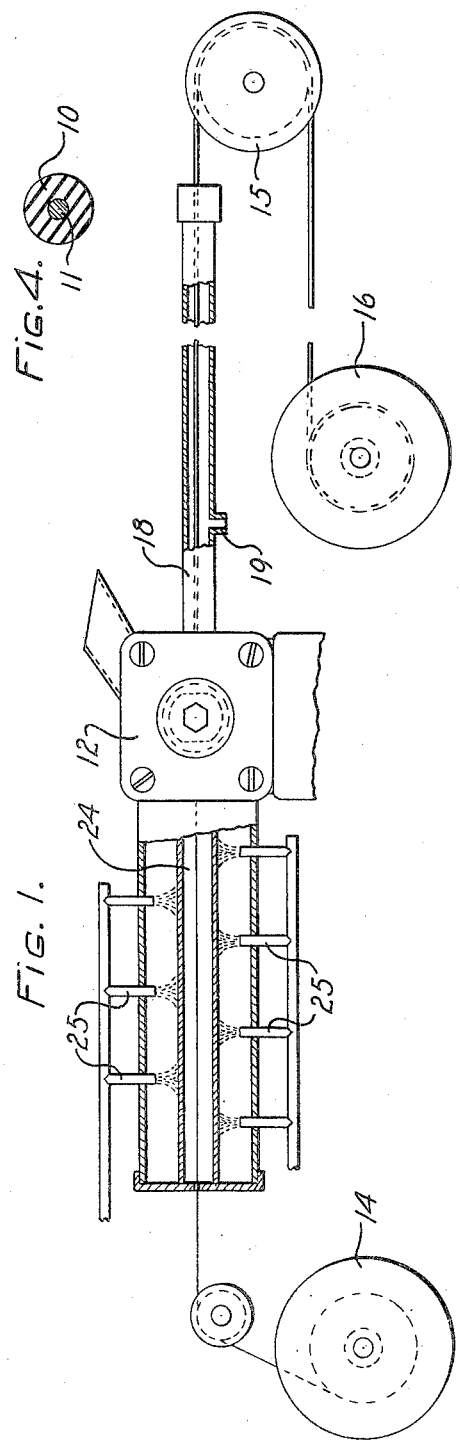
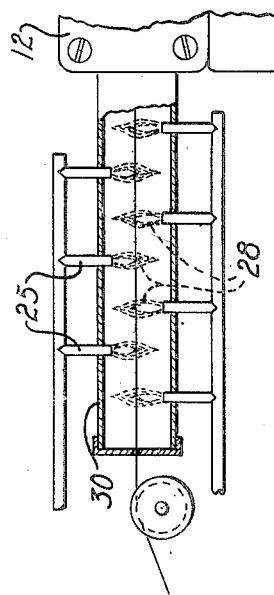
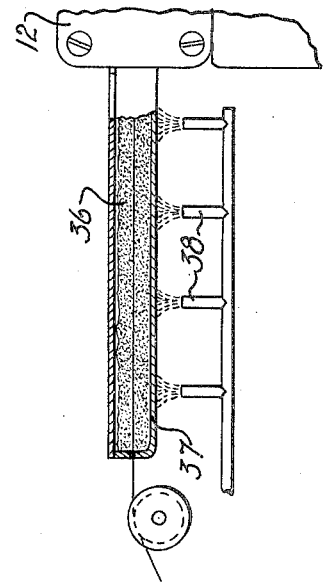
INVENTOR
L. F. LAMPLOUGH
BY
E. R. Nowlan
ATTORNEY Patented Oct. 30, 1934

1,978,586

UNITED STATES PATENT OFFICE 1,978,586

METHOD OF AND APPARATUS FOR VULCANIZING MATERIAL ON ARTICLES

Leslie F. Lamplough, Mount Washington, Md., assignor to Western Electric Company, Incorporated, New York, N. Y., a corporation of New York Application December 3, 1930, Serial No. 499,656

19 Claims. (Cl. 18—6)

REISSUED

This invention relates to methods of and apparatus for vulcanizing material on articles, and more particularly to methods of and apparatus for vulcanizing a rubber insulation on wire.

Objects of the invention are to improve, simplify and expedite the vulcanization of materials on articles.

The invention contemplates the provision of a method of and apparatus for vulcanizing materials on articles, wherein the article is heated immediately before the vulcanizable material is applied thereto, and all or a portion of the heat necessary to induce vulcanization is obtained by conduction from the heated article. In one embodiment of the invention, a rubber insulation is vulcanized on wire by pre-heating the wire and then extruding a covering of uncured rubber compound thereon, the covering being vulcanized on the wire by heat conducted from the heated wire. Any necessary additional heat to induce vulcanization may be obtained by subjecting the applied covering to a controlled heating medium, such as steam under pressure.

It is believed that a complete understanding of the invention will be had from the following detailed description, when read in conjunction with the accompanying drawing, wherein Fig. 1 is a diagrammatic elevational view, partly in section, of one form of apparatus embodying the features of the invention and by means of which the improved method may be practiced;

Figs. 2 and 3 are fragmentary sectional views showing other forms of apparatus embodying the invention, and Fig. 4 is an enlarged cross sectional view of a wire having a rubber insulating covering vulcanized thereon in accordance with the present invention.

In the accompanying drawing, one embodiment of the invention is diagrammatically illustrated in conjunction with an apparatus for continuously applying and vulcanizing a rubber insulating covering 10 (Fig. 4) on an electrical conductor or wire 11. The apparatus comprises an insulating head 12 of any suitable type adapted to extrude or otherwise apply under pressure a continuous uniform covering of a plastic rubber compound on the wire as it is drawn through the insulating head from a supply reel 14. The rubber insulated wire passes around a capstan 15 which delivers it to a take-up reel 16, the capstan being driven, by means not shown, at a predetermined speed which is coordinated with the extruding speed of the insulating head 12.

In accordance with the present invention, the wire is heated to a predetermined temperature immediately before the rubber compound is applied thereto, whereby all or a portion of the heat necessary to induce vulcanization in the rubber covering is obtained by conduction from the heated wire. When the heat conducted from the wire is insufficient to completely vulcanize the rubber covering, the necessary additional heat may be obtained by subjecting the covered wire to a controlled heating medium, such as steam under pressure. For example, when a relatively thick covering of rubber compound is applied on the wire, the heat conducted from the pre-heated wire may be sufficient to vulcanize only the layer or portion of the rubber compound immediately adjacent the wire. In such instances, the covered wire may be passed through an auxiliary vulcanizing chamber 18 (Fig. 1), wherein steam or any other suitable heating medium is admitted through an inlet 19, the heating medium in the chamber being maintained at a predetermined temperature and under a predetermined pressure as may be required to complete the vulcanization of the rubber covering.

Numerous methods may be employed for pre-heating the wire immediately before applying the rubber compound thereto. In the embodiment of the invention shown in Fig. 1, the wire is pre-heated by passing it through a heated chamber 24 immediately before it enters the insulating head 12. Any suitable means, such as one or more gas burners 25, may be employed for constantly maintaining a predetermined temperature within the chamber 24 to thereby insure the heating of the advancing wire to a predetermined temperature. The heated chamber 24 is preferably connected directly to the insulating head 12 so that the rubber compound is applied to the heated wire before the wire is exposed to the atmosphere.

In the embodiment of the invention illustrated in Fig. 2, the wire is pre-heated by passing it through one or more gas burner flames 28 immediately before the rubber compound is applied thereto. The gas flames may be enclosed in a chamber 30 adjoining the insulating head 12 so that the heated wire is not exposed to the atmosphere before the rubber compound is applied thereto.

In the embodiment of the invention shown in Fig. 3, the wire is pre-heated by passing it through a heated bath 36 of fine particles, such as sand or other suitable material contained in a container 37 adjoining the insulating head 12. Any suitable means, such as one or more gas burners 38 may be employed for heating and maintaining the contents of the container 37 at a predetermined temperature.

In some instances, it may be desirable to treat the surface of the wire or impart a predetermined characteristic thereto before applying the rubber compound thereon in order to insure an intimate bond between the wire and the rubber covering. For example, it may be desirable to oxidize, de-oxidize, clean, roughen, smooth, or otherwise change a characteristic of the surface of the wire before applying the rubber covering thereto. This may be accomplished either before, during or immediately after the pre-heating of the wire.

Thus, in the embodiment of the invention shown in Fig. 2, the surface of the wire may be oxidized or de-oxidized during the pre-heating process by employing oxidizing or reducing gas flames, respectively, in the heating chamber 30. In the embodiment of the invention shown in Fig. 3, the surface of the wire may be cleaned, roughened, or smoothed during the heating process according to the character of the material employed in the heating bath 36.

It is to be understood that the invention is not limited to the embodiments thereof herein illustrated and described, except in so far as is defined by the appended claims.

What is claimed is:

1. The method of forming and vulcanizing a covering on wire which comprises the steps of charging the wire with an amount of heat sufficient to effect vulcanization in vulcanizable material applied thereto, subsequently applying and forming a covering of a vulcanizable compound on the hot wire and subsequently applying heat to the exterior surface of the covering to effect vulcanization therein from without.

2. The method of forming and vulcanizing a covering on wire which comprises the steps of passing a wire through a heated chamber to charge the wire with an amount of heat sufficient to effect vulcanization from within in vulcanizable material applied thereto, subsequently applying and forming a covering of a vulcanizable compound on the hot wire, and subsequently applying heat to the exterior surface of the covering to effect vulcanization therein from without.

3. In an apparatus for continuously applying and forming a covering of vulcanized material on wire, means for continuously advancing a wire, means to charge the wire with an amount of heat sufficient to effect vulcanization from within in vulcanizable material applied thereto, means to continuously apply and form a covering of vulcanizable material on the hot wire, and means to heat the exterior of the covering to effect vulcanization therein from without.

4. In an apparatus for continuously applying and forming a covering of vulcanized material on a wire, means for continuously advancing a wire, means to charge the wire with an amount of heat sufficient to effect vulcanization from within in vulcanizable material applied thereto and to simultaneously modify the surface of the wire, means to continuously apply and form a covering of vulcanizable material on the hot wire, and means to heat the exterior of the covering to effect vulcanization therein from without.

5. In an apparatus for continuously applying and forming a covering of vulcanized material on a wire, means for continuously advancing a wire through the apparatus, an oven to charge the wire with an amount of heat sufficient to effect vulcanization from within in vulcanizable material applied thereto, an extrusion press to apply and form a covering of vulcanizable material on the hot wire, and a vulcanizing chamber to effect vulcanization in the covering from without.

6. In an apparatus for continuously applying and forming a covering of vulcanized material on a wire, means for continuously advancing a wire through the apparatus, an oven to charge the wire with an amount of heat sufficient to effect vulcanization from within in vulcanizable material applied thereto, an extrusion press to apply and form a covering of vulcanizable material on the hot wire, and a vulcanizing chamber to effect vulcanization in the covering from without, the said oven being internally heated by fuel flames through which the wire passes.

7. In an apparatus for continuously applying and forming a covering of vulcanized material on a wire, means for continuously advancing a wire through the apparatus, an oven to charge the wire with an amount of heat sufficient to effect vulcanization from within in vulcanizable material applied thereto, an extrusion press to apply and form a covering of vulcanizable material on the hot wire, and a vulcanizing chamber to effect vulcanization in the covering from without, the said oven being internally heated by fuel flames of a chemically oxidizing nature through which the wire passes.

8. In an apparatus for continuously applying and forming a covering of vulcanized material on a wire, means for continuously advancing a wire through the apparatus, an oven to charge the wire with an amount of heat sufficient to effect vulcanization from within in vulcanizable material applied thereto, an extrusion press to apply and form a covering of vulcanizable material on the hot wire, and a vulcanizing chamber to effect vulcanization in the covering from without, the said oven being internally heated by fuel flames of a chemically reducing nature through which the wire passes.

9. In an apparatus for continuously applying and forming a covering of vulcanized material on a wire, means for continuously advancing a wire through the apparatus, an oven to charge the wire with an amount of heat sufficient to effect vulcanization from within in vulcanizable material applied thereto, an extrusion press to apply and form a covering of vulcanizable material on the hot wire, and a vulcanizing chamber to effect vulcanization in the covering from without, the said oven being externally heated and internally filled with material to modify the surface of the wire passing therethrough.

10. The method of forming and vulcanizing a covering on wire which comprises the steps of passing a wire through a heated atmosphere to modify the surface thereof and to simultaneously charge the wire with an amount of heat sufficient to effect vulcanization from within in vulcanizable material applied thereto, subsequently applying and forming a covering of a vulcanizable compound on the hot wire, and subsequently applying heat to the exterior surface of the covering to effect vulcanization therein from without.

11. The method of forming and vulcanizing a covering on wire which comprises the steps of passing a wire through a heated atmosphere to modify the surface thereof chemically and to simultaneously charge the wire with an amount of heat sufficient to effect vulcanization from within in vulcanizable material applied thereto, subsequently applying and forming a covering of a vulcanizable compound on the hot wire, and subsequently applying heat to the exterior surface of the covering to effect vulcanization therein from without.

12. The method of forming and vulcanizing a covering on wire which comprises the steps of passing a wire through a heated atmosphere to oxidize the surface thereof and to simultaneously charge the wire with an amount of heat sufficient to effect vulcanization from within in vulcanizable material applied thereto, subsequently applying and forming a covering of a vulcanizable compound on the hot wire, and subsequently applying heat to the exterior surface of the covering to effect vulcanization therein from without.

13. The method of forming and vulcanizing a covering on wire which comprises the steps of passing a wire through a heated atmosphere to reduce the surface thereof and to simultaneously charge the wire with an amount of heat sufficient to effect vulcanization from within in vulcanizable material applied thereto, subsequently applying and forming a covering of a vulcanizable compound on the hot wire, and subsequently applying heat to the exterior surface of the covering to effect vulcanization therein from without.

14. The method of forming and vulcanizing a covering on wire which comprises the steps of passing a wire through a heated atmosphere to modify the surface thereof mechanically and to simultaneously charge the wire with an amount of heat sufficient to effect vulcanization from within in vulcanizable material applied thereto, subsequently applying and forming a covering of a vulcanizable compound on the hot wire, and subsequently applying heat to the exterior surface of the covering to effect vulcanization therein from without.

15. A method of manufacturing wire with a covering of vulcanized material comprising the steps of charging the uncovered wire with an amount of heat sufficient to effect vulcanization from within in vulcanizable material applied thereto, and subsequently applying and forming a covering of vulcanizable material on the hot wire.

16. In an apparatus for continuously applying and forming a covering of vulcanized material on a wire, means for continuously advancing a wire, means to charge the wire with an amount of heat sufficient to effect vulcanization from within in vulcanizable material applied thereto and to simultaneously chemically modify the surface of the wire, means to continuously apply and form a covering of vulcanizable material on the hot wire, and means to heat the exterior of the covering to effect vulcanization therein from without.

17. In an apparatus for continuously applying and forming a covering of vulcanized material on a wire, means for continuously advancing a wire, means to charge the wire with an amount of heat sufficient to effect vulcanization from within in vulcanizable material applied thereto and to simultaneously oxidize the surface of the wire, means to continuously apply and form a covering of vulcanizable material on the hot wire, and means to heat the exterior of the covering to effect vulcanization therein from without.

18. In an apparatus for continuously applying and forming a covering of vulcanized material on a wire, means for continuously advancing a wire, means to charge the wire with an amount of heat sufficient to effect vulcanization from within in vulcanizable material applied thereto and to simultaneously reduce the surface of the wire, means to continuously apply and form a covering of vulcanizable material on the hot wire, and means to heat the exterior of the covering to effect vulcanization therein from without.

19. In an apparatus for continuously applying and forming a covering of vulcanized material on a wire, means for continuously advancing a wire, means to charge the wire with an amount of heat sufficient to effect vulcanization from within in vulcanizable material applied thereto and to simultaneously mechanically modify the surface of the wire, means to continuously apply and form a covering of vulcanizable material on the hot wire, and means to heat the exterior of the covering to effect vulcanization therein from without.

LESLIE F. LAMPLOUGH.